United States Patent
Giannasca (10) Patent No.: US 7,383,786 B2
(45) Date of Patent: Jun. 10, 2008

(54) ACTIVE PLATFORM FOR A BOAT

(76) Inventor: John Giannasca, P.O. Box 14, Point Lookout, NY (US) 11569

( * ) Notice: Subject to any disclaimer, the term of this patent is extended or adjusted under 35 U.S.C. 154(b) by 0 days.

(21) Appl. No.: 11/329,016

(22) Filed: Jan. 10, 2006

(65) Prior Publication Data

US 2006/0219149 A1  Oct. 5, 2006

Related U.S. Application Data (63) Continuation-in-part of application No. 10/907,332, filed on Mar. 29, 2005.

(51) Int. Cl.
*B63B 17/00* (2006.01)

(52) U.S. Cl. .................. 114/343; 108/144.11; 108/145; 108/147; 108/147.22

(58) Field of Classification Search ................ 114/268, 114/382, 343, 85; 187/210, 211; 182/69.5, 182/69.4, 69.6; 108/144.11, 147, 145, 147.22, 108/57.12
See application file for complete search history.

(56) References Cited

U.S. PATENT DOCUMENTS

| | | | |
|---|---|---|---|
| 1,970,630 A | 8/1934 | Searing | |
| 2,059,059 A * | 10/1936 | Thompson | 187/208 |
| 2,277,171 A | 3/1942 | Traylor | |
| 2,901,208 A | 8/1959 | Jones | |
| 3,203,670 A * | 8/1965 | Farris | 254/122 |
| 3,351,314 A | 11/1967 | Hirsch et al. | |
| 3,701,226 A * | 10/1972 | Fulcher | 52/109 |
| 3,796,282 A * | 3/1974 | Denier et al. | 182/141 |
| 3,961,681 A * | 6/1976 | Fisher | 180/305 |
| 4,151,804 A * | 5/1979 | Wache et al. | 108/147 |
| 4,232,901 A * | 11/1980 | Harrington et al. | 297/423.45 |
| 4,930,435 A | 6/1990 | Newman | |
| 5,435,260 A * | 7/1995 | Granie et al. | 114/61.1 |
| 5,771,816 A * | 6/1998 | Zaguroli, Jr. | 108/147 |
| 6,244,205 B1 | 6/2001 | Saccocio | |
| 6,698,371 B1 * | 3/2004 | Stoltzfus | 114/61.1 |
| 6,763,774 B1 | 7/2004 | Ranieri et al. | |

* cited by examiner

*Primary Examiner*—Sherman Basinger
(74) *Attorney, Agent, or Firm*—Collard & Roe, P.C.

(57) ABSTRACT

A device for elevating a platform over a boat deck. This type of device can include a platform, a drive, and at least one driven lift which is in communication with the drive. This driven lift can be coupled at a first end to the platform and at a second end to the boat deck. There can also be at least one controller in communication with the drive. In this case, the controller can be for controlling a height of the lift.

5 Claims, 8 Drawing Sheets

ACTIVE PLATFORM FOR A BOAT

CROSS REFERENCE TO RELATED APPLICATIONS

This application is a continuation in part application and hereby claims priority under 35 U.S.C. 120 from U.S. application Ser. No. 10/907,332 filed on Mar. 29, 2005 the disclosure of which is hereby incorporated herein by reference.

BACKGROUND OF THE INVENTION

The present invention relates to an active platform device that can be coupled to a deck of a boat and which can be used to actively raise or lower a support surface on a deck of the boat.

Other types of boat, deck or support type platforms are known. For example the following U.S. Patents generally relate to this field: U.S. Pat. No. 6,763,774 to Ranieri et al; U.S. Pat. No. 1,970,630 to Searing; U.S. Pat. No. 2,277,171 to Traylor; U.S. Pat. No. 2,901,208 to Jones; U.S. Pat. No. 3,351,314 to Hirsch et al; U.S. Pat. No. 4,930,435 to Newman; U.S. Pat. No. 6,244,205 to Saccocio wherein the disclosures of these patents are hereby incorporated herein by reference.

SUMMARY OF THE INVENTION

The invention can relate to a device for elevating a platform over a boat deck. This type of device can include a platform, a drive, and at least one driven lift which is in communication with the drive. This driven lift can be coupled at a first end to the platform and at a second end to the boat deck. There can also be at least one controller in communication with the drive. In this case, the controller can be for controlling a height of the lift.

In one example, the drive can be a pneumatic drive. In another example, the drive can be an electrical drive. This device can also include at least one shock absorber coupled to the lift. In one example, this lift is in the form of a scissor lift.

This scissor lift can include at least two arms, and at least one substantially central connection point between the arms. This scissor lift can include at least two additional arms, wherein these two additional arms are coupled to the first two arms.

In another example, this lift can be in the form of a rack and pinion gear wherein this rack extends in a substantially vertical manner, wherein this pinion gear is in communication with, and is driven by the drive, and can rotate either up or down this rack. With this type of drive, there can be least one additional rack and at least one additional pinion gear coupled to the rack, and disposed on an opposite side of the platform.

The drive for the scissor type lift can be formed so that it is coupled to the two arms wherein the drive creates a substantially pushing or pulling motion to create movement in the arms.

This drive can be coupled to the two arms and the shock absorber can be formed either separate from or integral with the drive so that when the drive moves into position and is then shut off, the at least one shock absorber can act to counteract any shocks associated with movement of a boat.

To control this device there can be a controller that is mounted on a dashboard of a boat.

This boat can have an engine and a drive that is in electrical communication with the engine and obtains power from that engine.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
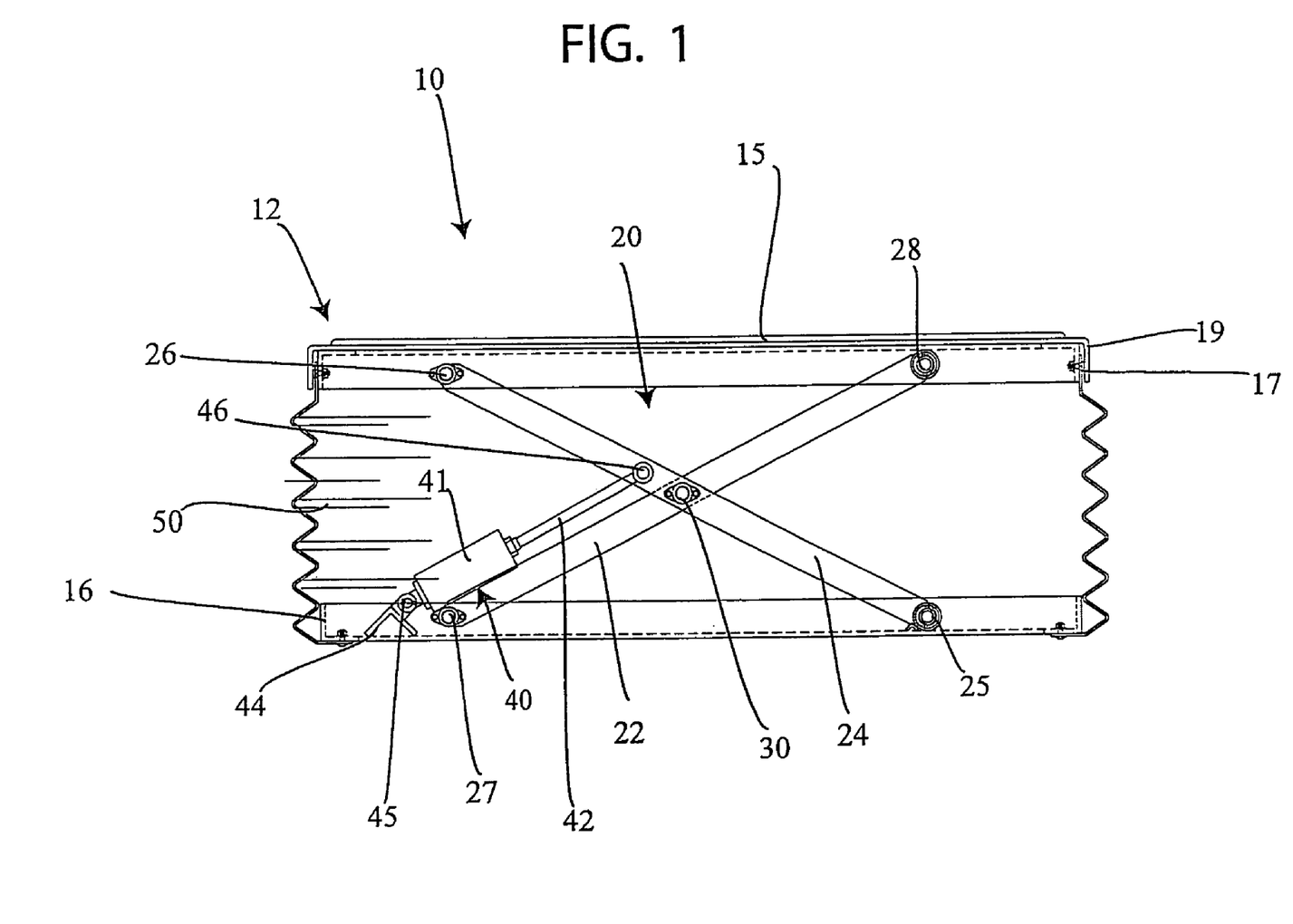
FIG. 1 is a side view of a first embodiment of the invention.

FIG. 1 is a side view of a first embodiment of the device 10 wherein in this view there is shown a platform 12, having a top surface such as a rubberized surface 15. There is also a lift 20 coupled to this surface at one end and also coupled to a base 16 at an opposite end. Platform 12 can include an inner section 17 and an outer section 19. This platform is designed to support a person above a deck or boating surface.

Figure 2:
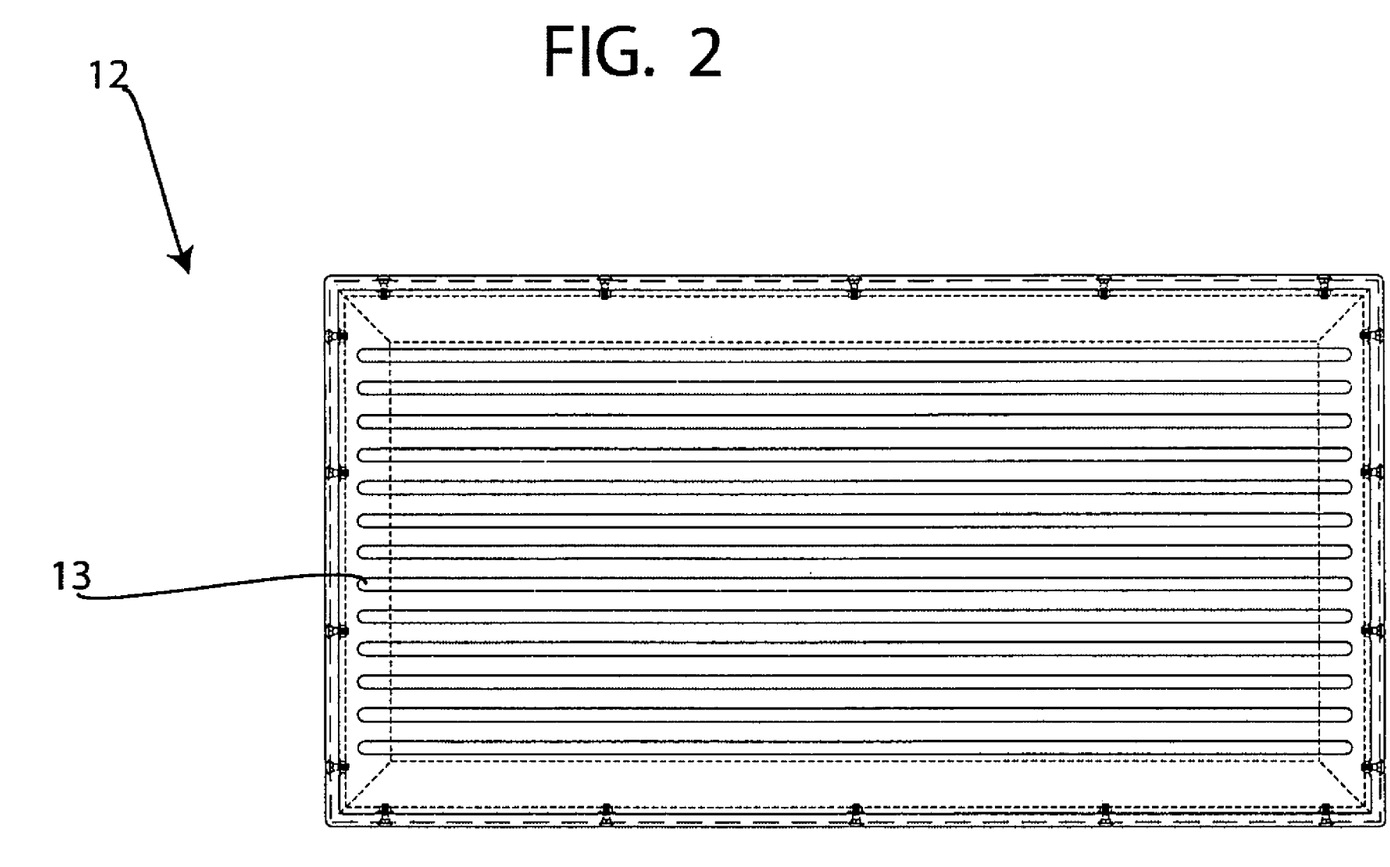
FIG. 2 is a top view of the device shown in FIG. 1.

Platform 12 is shown in greater detail in FIG. 2 and includes

Lift 20 can include scissor arms such as scissor arms 22 and 24. These scissor arms can be coupled together in a center region 30 via a rotational coupling. In addition, scissor arm 22 can be coupled at a first end to base 16 via a rotatable coupling 27 and at a second end to platform 12 via another opposite rotatable coupling 28. Scissor arm 24 is coupled at a first end via rotatable coupling 25 to base 16 and at an opposite end to platform 12 via rotatable coupling 26.

Figure 4A:
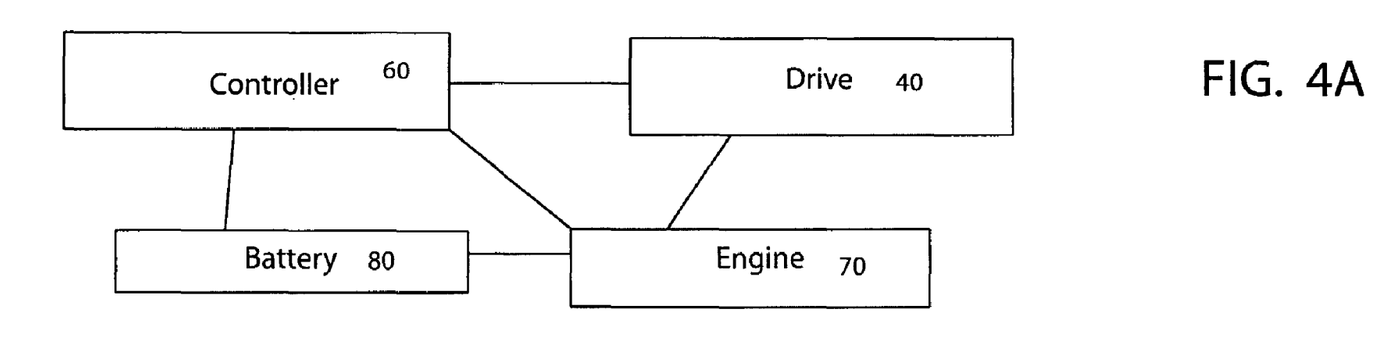
FIG. 4A is a schematic block diagram of the a first layout of the device including the controller.
Figure 4B:
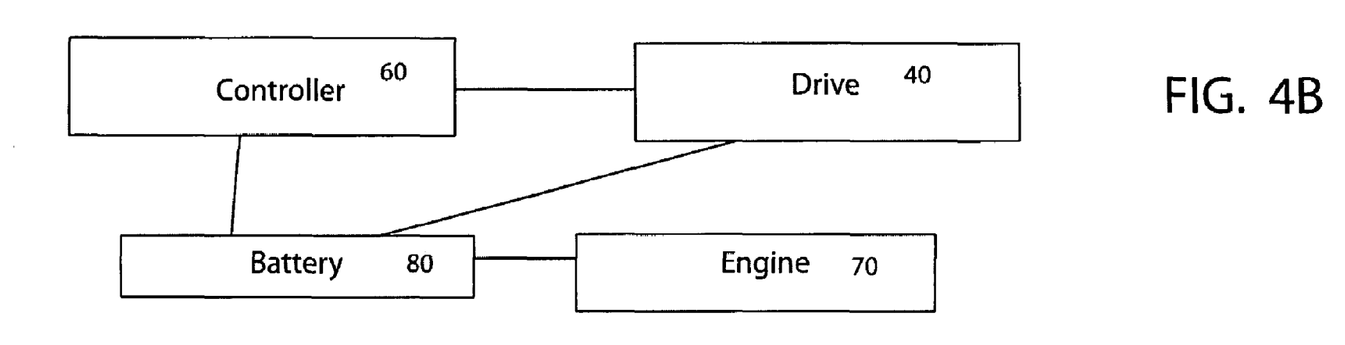
FIG. 4B is another embodiment shown by a schematic block diagram.

There is a drive 40 which is coupled to scissor arms 20 which can also optionally function as a shock absorber. Drive 40 can include a drive cylinder 41 which can either be in power communication with engine 70 as shown in FIG. 4A or in electrical communication with battery 80 as shown in FIG. 4B. Drive 40 is coupled at a first end to a drive stand 44 via a rotational coupling 45 and is coupled to arm 24 at a second end via a rotational coupling 46. The movement of drive arm 42 in and out from drive cylinder 41 can occur via an associated pushing or pulling movement.

This entire device can be enclosed by a cover 50 which can be in the form of a substantially durable cover formed from any known substantially flexible material. This cover can be an accordion type cover which is easily collapsible or expandable depending on the movement of platform 12.

Cover extends up from base 16 and fits into platform 12 between inner surface 17 on platform 12 and outer surface 19.

This view also shows the means for coupling base 16 to a boat deck such as by using screws or bolts.

FIG. 2 is a top view of the device shown in FIG. 1. In this view, there is platform 12 which has a plurality of strips 13 disposed on a top surface 15 (See FIG. 1) which can be used to allow an individual to grip the surface of this platform. In this case, these strips can extend in a substantially parallel manner and can be formed from a gritty type surface which allows a user to grip this surface.

Figure 3:
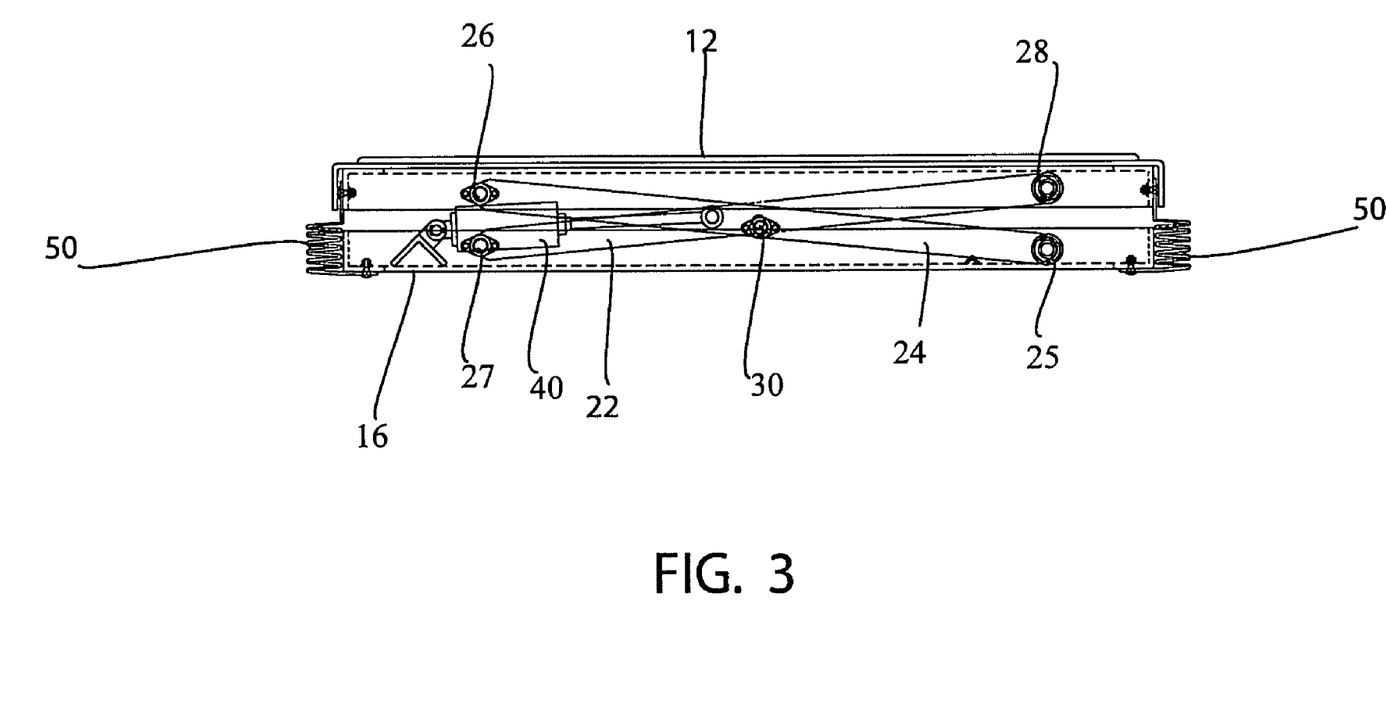
FIG. 3 is a side view of the embodiment shown in FIG. 1 in a collapsed form.

FIG. 3 is a side view of the embodiment shown in FIG. 1 in a collapsed form. In this collapsed form, the scissor arms 22 and 24 are collapsed via hinge 30 and also platform 12 is closed down on top of base 16 so that it forms a closed structure which is closed on its sides by container or flexible cover 50. In this position, drive 40 is in its fully extended mode such that the drive arm is extended out to its fullest length to allow this device to fold down into a collapsed form.

Figure 6:
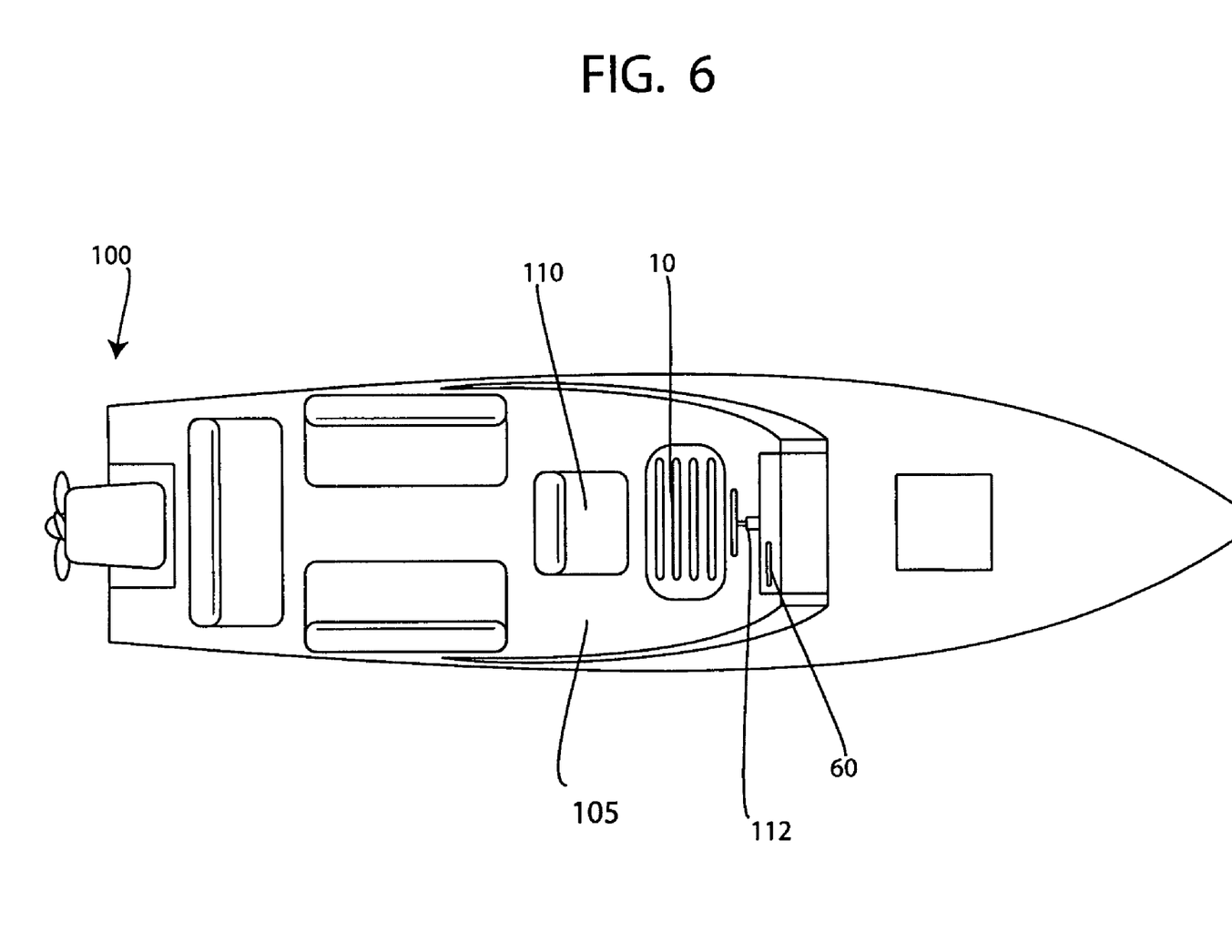
FIG. 6 is a top view of the device installed on a boat.

FIG. 4A is a schematic block diagram of a first layout of the device including the controller 60. In this view, drive 40 can be a pneumatic drive which receives its power from a boat engine such as engine 70. In addition, drive 40 can be controlled by a controller 60 which can be in the form of an electronic set of controls which are positioned on a boat dashboard as shown in FIG. 6. These controls can be used to control drive 40 to adjust the height of platform 12 to the desired height.

FIG. 4B is another embodiment shown by a schematic block diagram. In this embodiment, the drive is not pneumatically controlled by the engine but is controlled electrically through the power stored in battery 80. Battery 80 can be used to provide power to the necessary components on the boat such as controller 60, engine 70 which can access the battery power to start the engine, and in this instance drive 40.

Figure 5:
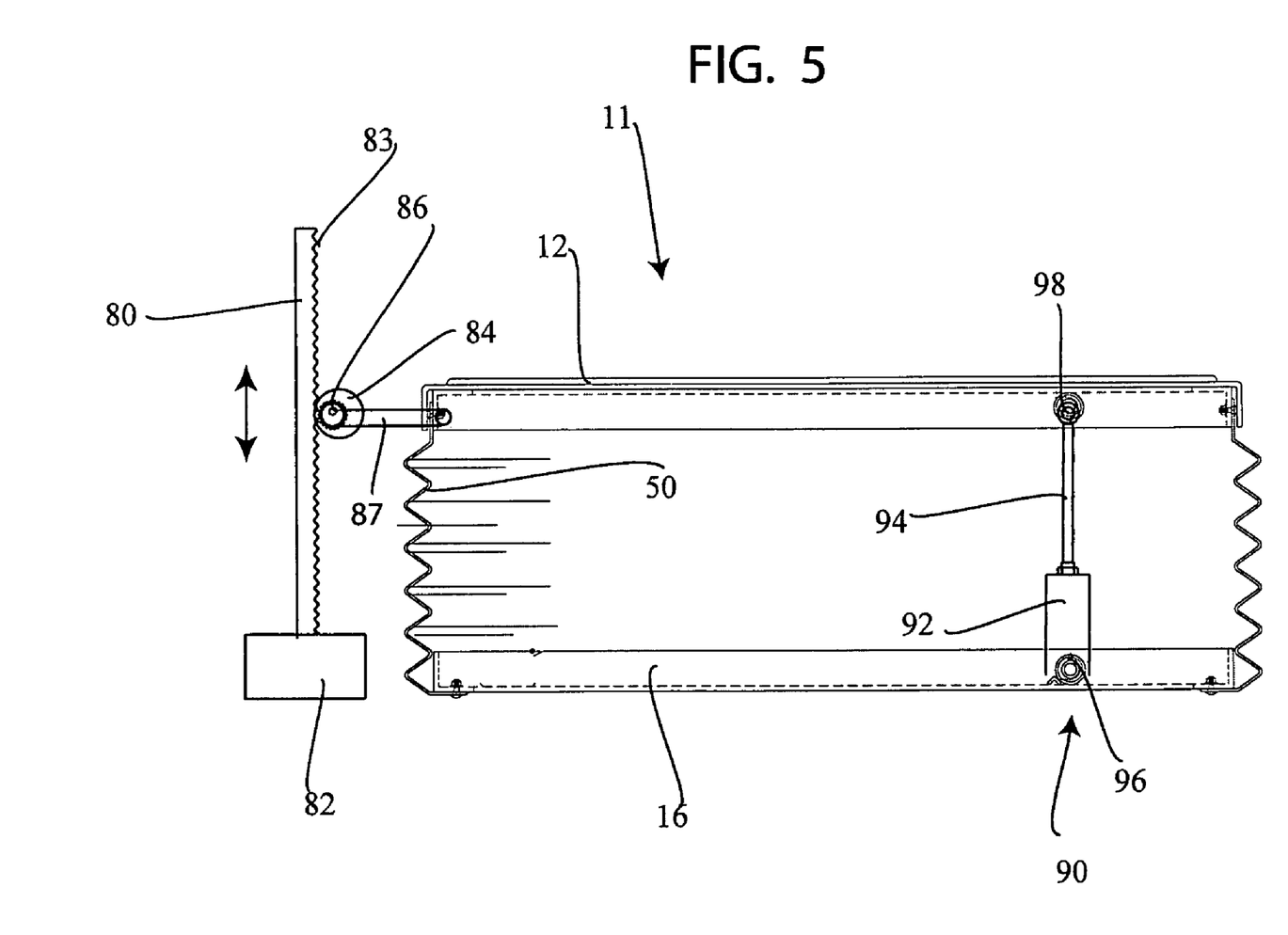
FIG. 5 is a side view of another embodiment of the device.

FIG. 5 is a side view of another embodiment of the device, wherein this embodiment 11 includes a ratchet based lift 80 which includes a base 82, a shaft 83 having teeth. There is also a drive 84 which is coupled to a toothed gear 86 wherein this toothed gear 86 is for meshing with the teeth on shaft 83. Thus, drive 84 creates a turning motion in toothed gear 86 so that toothed gear can rotate to drive up or down shaft 83. This drive and toothed gear can be coupled to shaft 83 so that it creates a compression force towards toothed shaft 83 so that gears on toothed gear 86 always mesh with toothed shaft 83.

This drive 84 and the toothed gear 86 are coupled to a shaft 87 that is rotationally adjustable but can also be fixed in place so that it can be used to adjust platform 12 up or down so that it can be moved into place.

In addition, an additional support 90 can be coupled to platform 12 wherein this additional support 90 can be in the form of a telescoping shaft 94 that is coupled to a shock absorbing tube 92 to create a shock absorbing shaft type system. This shaft 94 is coupled to a coupling element 98 which can be in the form of a rotational coupling element. Because this device is in the form of a shock absorber, it can be used to absorb any shocks created by the movement of a boat. This additional support 90 can be coupled at its base end to base 16, wherein that base is coupled to the deck. A flexible cover 50 which may be in the form of an accordion type structure can be coupled at a first end to base 16 and at an opposite end to platform 12. This cover 50 can be used to cover over additional support 90.

FIG. 6 is a top view of the device 10 installed on a deck 105 of a boat 100. With this view, there is a boating seat 110, a steering wheel 112 and a controller 60 which can be used to control the height of the platform on the device.

Figure 7:
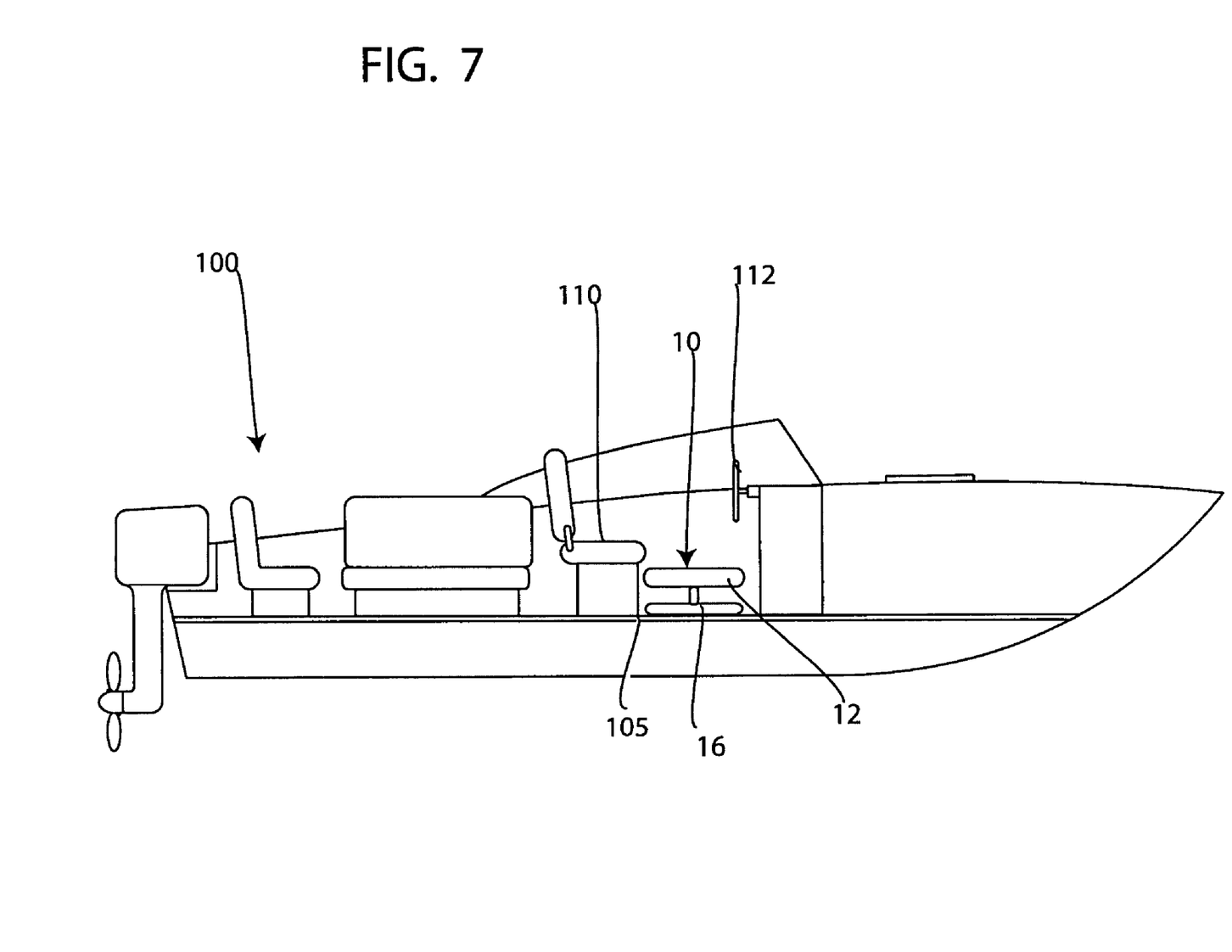
FIG. 7 is a side view of the device installed on a boat.

FIG. 7 shows a side view of the boat 100 wherein this view shows that base 16 is coupled to deck 105 between seat 110 and steering wheel 112. This view shows that platform 12 can be raised or lowered so that it provides a stable support for a user.

Figure 8:
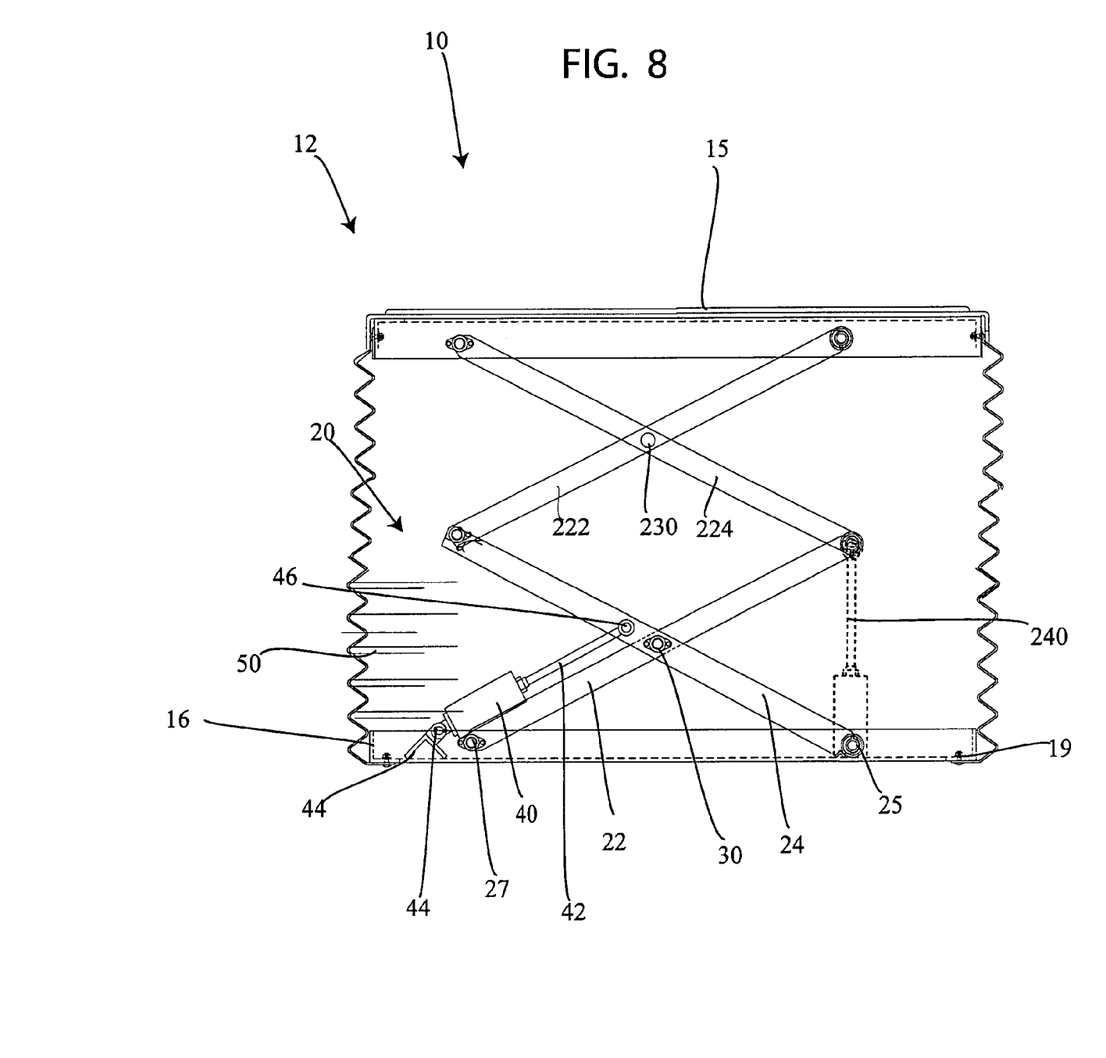
FIG. 8 is a side view of another embodiment of the invention.

FIG. 8 is another embodiment of the invention which is designed as a larger lifting device for lifting a platform. In this view, device 200 includes two sets of scissor arms, a first set including arms 22 and 24 and also a second set including scissor arms 222 and 224. This device can be used to raise platform 12 up to a much higher level than with the other design. With this design, as the scissor arms 22 and 24 are moved or rotated against each other via drive 40 to raise scissor arms 22 and 24 into a substantially vertical position, this causes additional scissor arms 222 and 224 to move as well creating a lift in platform 12 above base 16. In this view there is also shown another alternative type of drive 240 which can be in the form of a substantially vertical telescoping drive which can be used to drive platform 12 either up or down. This device may also include a shock absorbing device which can be used to absorb the shocks presented from a moving boat.

With the designs presented above, the device can be in the form of a shock absorbing platform which can be moved actively by a controller up and down. With this movement the user can then position himself or herself into a better viewing position.

Accordingly, while a few embodiments of the present invention have been shown and described, it is to be understood that many changes and modifications may be made thereunto without departing from the spirit and scope of the invention as defined in the appended claims.

What is claimed is:

1. A boat surface lifting device for a boat having a seat and a steering wheel comprising:
   a) a platform disposed between the seat and the steering wheel of the boat;
   b) a drive means;
   c) at least one driven lift which is in communication with said drive means and which is coupled at a first end to said platform and at a second end to the boat deck wherein said at least one driven lift is in the form of at least two scissor arms being coupled together in a central region via a central coupling;
   d) at least one controller in communication with said drive means, said controller for controlling a height of said lift; and
   e) at least one shock absorber coupled to said platform wherein said at least one shock absorber is for absorbing shocks from movement of the boat.

2. The device as in claim 1, wherein said at least two scissor arms comprises at least four scissor arms in the form of at least two sets of two scissor arms with at least a first set of scissor arms being coupled to at least a second set of scissor arms.

3. A boat surface lifting device for a boat having a seat and a steering wheel comprising:
   a) a platform disposed between the seat and the steering wheel of the boat;

b) a drive;
c) at least one driven lift which is coupled to said drive and which is coupled at a first end to said platform and at a second end to the boat deck wherein said at least one driven lift is in the form of at least scissor arms being coupled together in a central region via a central coupling;
d) at least one controller in communication with said drive, said controller for controlling a height of said lift; and
e) at least one shock absorber coupled to said platform wherein said at least one shock absorber is for absorbing shocks from movement of the boat; and f) at least one cover, said cover being coupled to said platform and for covering said drive and said at least one driven lift.

4. The boat surface lifting device as in claim 3, wherein the boat has a dashboard and wherein said controller is mounted on the dashboard of the boat.

5. The boat surface lifting device as in claim 3, wherein said platform has a top surface having a plurality of strips.

* * * * *